United States Patent
Park (10) Patent No.: US 8,480,251 B2
(45) Date of Patent: *Jul. 9, 2013

(54) BACKLIGHT ASSEMBLY HAVING LEDS AND SIDE REFLECTORS AND DISPLAY APPARATUS HAVING THE SAME

(75) Inventor: Jun Seok Park, Gwangju (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/586,373

(22) Filed: Aug. 15, 2012

(65) Prior Publication Data

US 2012/0307489 A1 Dec. 6, 2012

Related U.S. Application Data (63) Continuation of application No. 11/720,239, filed as application No. PCT/KR2006/001868 on May 18, 2006, now Pat. No. 8,267,543.

(30) Foreign Application Priority Data

May 26, 2005 (KR) .................. 10-2005-0044369

(51) Int. Cl.
- *F21V 5/00* (2006.01)
- *F21V 21/00* (2006.01)
- *F21V 7/00* (2006.01)

(52) U.S. Cl.
USPC ........... 362/241; 362/247; 362/97.4; 362/246

(58) Field of Classification Search
USPC .............. 362/231, 235, 237, 240–241, 247, 362/297, 308, 97.1–97.4, 246, 245, 249.02
See application file for complete search history.

(56) References Cited

U.S. PATENT DOCUMENTS

| | | | |
|---|---|---|---|
| 4,345,308 A | 8/1982 | Mouyard et al. |
| 4,630,180 A | 12/1986 | Muraki et al. |
| 5,819,454 A | 10/1998 | Rosenitsch |
| 6,439,731 B1 | 8/2002 | Johnson et al. |
| 6,527,410 B2 | 3/2003 | Yamaguchi |
| 6,840,654 B2 | 1/2005 | Guerrieri et al. |
| 6,871,982 B2 | 3/2005 | Holman et al. |
| 7,204,604 B2 | 4/2007 | Chou |
| 7,556,391 B2 | 7/2009 | Matsushita |
| 7,703,964 B2 | 4/2010 | Takata |
| 7,784,986 B2 | 8/2010 | Adachi et al. |

(Continued)

FOREIGN PATENT DOCUMENTS

| | | |
|---|---|---|
| JP | 05-052882 A | 3/1993 |
| JP | 2001-127344 A | 5/2001 |

(Continued)

OTHER PUBLICATIONS

Office Action dated Jun. 28, 2011 in Japanese Application No. 2008-513359, filed Jun. 26, 2007.

(Continued)

*Primary Examiner* — Thomas Sember
(74) *Attorney, Agent, or Firm* — Saliwanchik, Lloyd & Eisenschenk (57) ABSTRACT

A backlight assembly includes: a light emitting unit having a plurality of unit LEDs formed in a matrix, each of the unit LEDs having a red LED, a green LED, and a blue LED; a plurality of bottom reflectors disposed under the respective unit LEDs; and a plurality of side reflectors disposed around the respective unit LEDs.

20 Claims, 7 Drawing Sheets

U.S. PATENT DOCUMENTS

| | | |
|---|---|---|
| 2003/0052594 A1 | 3/2003 | Matsui et al. |
| 2003/0072153 A1 | 4/2003 | Matsui et al. |
| 2003/0137739 A1 | 7/2003 | Yoshida et al. |
| 2003/0185012 A1 | 10/2003 | Sitzema, Jr. et al. |
| 2004/0008524 A1 | 1/2004 | Lee et al. |
| 2004/0062040 A1 | 4/2004 | Blume et al. |
| 2004/0218388 A1 | 11/2004 | Suzuki |
| 2004/0218390 A1 | 11/2004 | Holman et al. |
| 2005/0138852 A1 | 6/2005 | Yamauchi |
| 2006/0034090 A1 | 2/2006 | Chen et al. |
| 2006/0158905 A1 | 7/2006 | Lai et al. |
| 2006/0203464 A1 | 9/2006 | Kang et al. |
| 2006/0221612 A1 | 10/2006 | Song et al. |
| 2007/0070625 A1 | 3/2007 | Bang |
| 2007/0091584 A1 | 4/2007 | Chang |
| 2007/0121320 A1 | 5/2007 | Arai et al. |
| 2008/0101069 A1 | 5/2008 | Chang |

FOREIGN PATENT DOCUMENTS

| | | |
|---|---|---|
| JP | 2001-195904 | 7/2001 |
| JP | 2002-245813 A | 8/2002 |
| JP | 2004-006317 A | 1/2004 |
| JP | 2004-354534 A | 12/2004 |
| KR | 10-2002-0084132 A | 11/2002 |
| KR | 10-2004-0086604 A | 10/2004 |
| WO | WO-2004/032235 A2 | 4/2004 |
| WO | WO-2006/126802 A1 | 11/2006 |

OTHER PUBLICATIONS

Office Action dated Jul. 13, 2011 in Korean Application No. 10-2005-0044369, filed May 26, 2005.

BACKLIGHT ASSEMBLY HAVING LEDS AND SIDE REFLECTORS AND DISPLAY APPARATUS HAVING THE SAME

CROSS-REFERENCE TO RELATED APPLICATIONS

This application is a continuation of U.S. application Ser. No. 11/720,239, filed May 25, 2007, which is the U.S. national stage application of International Patent Application No. PCT/KR2006/001868, filed May 18, 2006, which claims priority to Korean Patent Application No. 10-2005-0044369, filed May 26, 2005, all of which are incorporated herein by reference in their entirety.

TECHNICAL FIELD

The present invention relates to a backlight assembly, and more particularly, to a backlight assembly and a display device having the same.

BACKGROUND ART

In the fields of image display devices, cathode ray tubes (CRTs) are being replaced with liquid crystal display devices (LCDs) and plasma display panels (PDPs).

LCDs are light and slim and have low power consumption. Also, LCDs do not radiate harmful electromagnetic waves. Because of these advantages, LCDs are considered as next-generation image display devices.

An LCD includes a bottom substrate, a top substrate, and a liquid crystal layer. A plurality of thin film transistors (TFTs) are formed in the bottom substrate, and color filters are arranged in the top substrate. The liquid crystal layer is interposed between the bottom substrate and the top substrate. The liquid crystal layer is formed by injecting liquid crystal between the two substrates.

The TFTs formed in the bottom substrate function to transmit and control electric signals. Also, molecular structure of liquid crystal is changed according to voltage applied thereto and thus light transmissivity is controlled. Through these procedures, the controlled light passes through the top substrate and are displayed as a desired image.

Meanwhile, since the LCD is a light receiving device that displays an image by controlling an amount of incident light, the LCD requires a backlight assembly that is a light source emitting light on a liquid crystal panel.

The backlight assembly is classified into a direct type backlight assembly and an edge type backlight assembly according to the arrangement of the light source. The direct type backlight assembly has high light utilization and is convenient to handle. Also, the direct type backlight assembly has no limitation in a screen size. Therefore, the direct type backlight assembly is widely used in large-sized LCDs.

External light sources for the backlight assembly can be appropriately selected according to size and purpose of the LCD. Examples of the external light sources include a point light source (e.g., an incandescent lamp, a white halogen lamp, etc.), a line light source (e.g., a hot cathode fluorescent lamp, a cold cathode fluorescent lamp, an external electrode fluorescent lamp, etc.), an electroluminescent (EL) lamp, and a surface light source (e.g. matrix type light emitting diodes (LED)).

With the large scale of display devices, various researches are conducted to improve light efficiency of the backlight assembly for large-sized display devices, for example 30 inches or more.

DISCLOSURE OF INVENTION

Technical Problem

The present invention is to provide a backlight assembly that can improve the degree of color mixture and brightness uniformity, and a display device using the same.

Technical Solution

According to an aspect of the present invention, there is provided a backlight assembly including: a light emitting unit having a plurality of unit LEDs formed in a matrix, each of the unit LEDs having a red LED, a green LED, and a blue LED; a plurality of bottom reflectors disposed under the respective unit LEDs; and a plurality of side reflectors disposed around the respective unit LEDs.

In another aspect of the present invention, there is provided a backlight assembly including: a plurality of unit LEDs; a plurality of bottom reflectors formed under the respective unit LEDs; a plurality of side reflectors formed at boundaries of the respective unit LEDs; and a diffusion sheet supported by the side reflectors.

In a further another aspect of the present invention, there is provided a display device including: a backlight assembly having: a light emitting unit including a plurality of unit LEDs formed in a matrix, each of the unit LEDs having a red LED, a green LED, and a blue LED; a plurality of bottom reflectors disposed under the respective unit LEDs; and a plurality of side reflectors disposed around the respective unit LEDs; and a panel receiving the light emitted from the backlight assembly.

Advantageous Effects

The backlight assembly and the image display device having the same according to the present invention can improve the degree of color mixture and brightness uniformity when providing light for the image display. Also, the diffusion sheet can be easily installed and designed.

BEST MODE FOR CARRYING OUT THE INVENTION

Hereinafter, the embodiments of the present invention will be described in detail with reference to the accompanying drawings.

Figure 1:
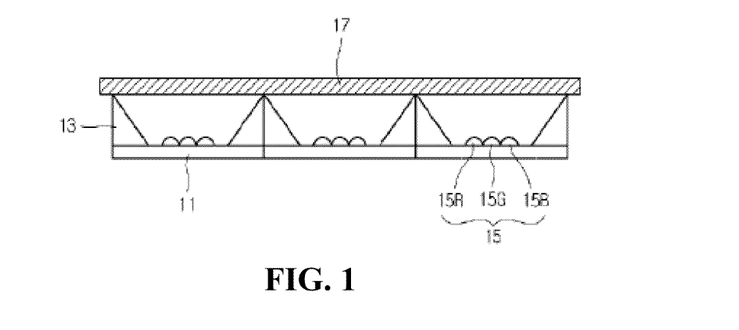
FIG. 1 is a sectional view of a backlight assembly according to the present invention.
Figure 2:
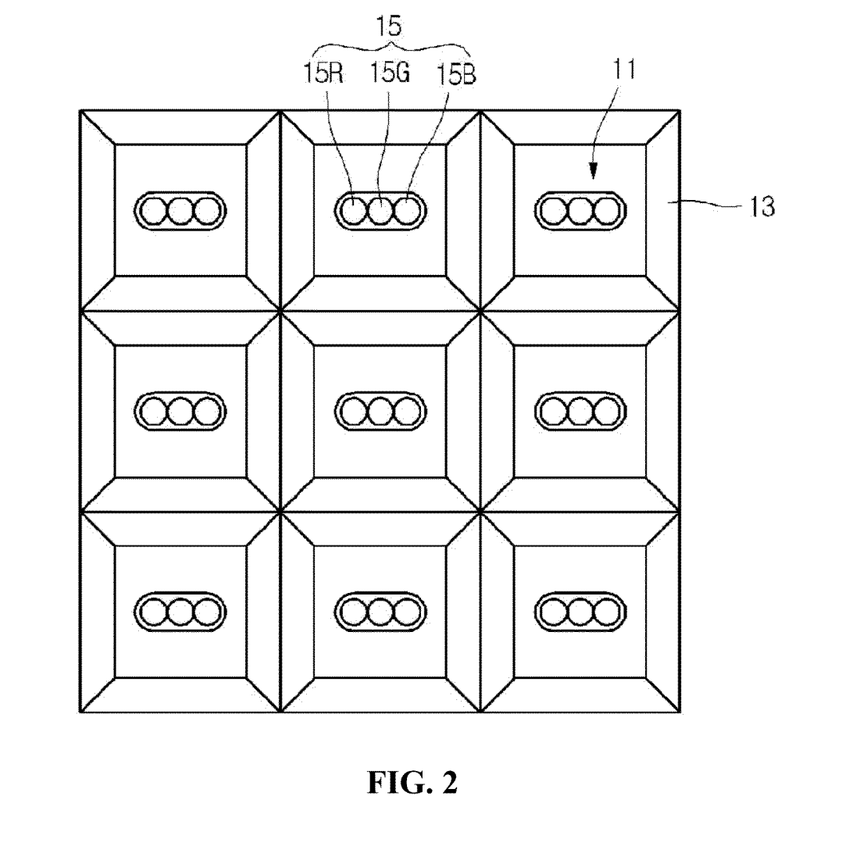
FIG. 2 is a plan view of an unit LED array in the backlight assembly according to the present invention.
Figure 3:
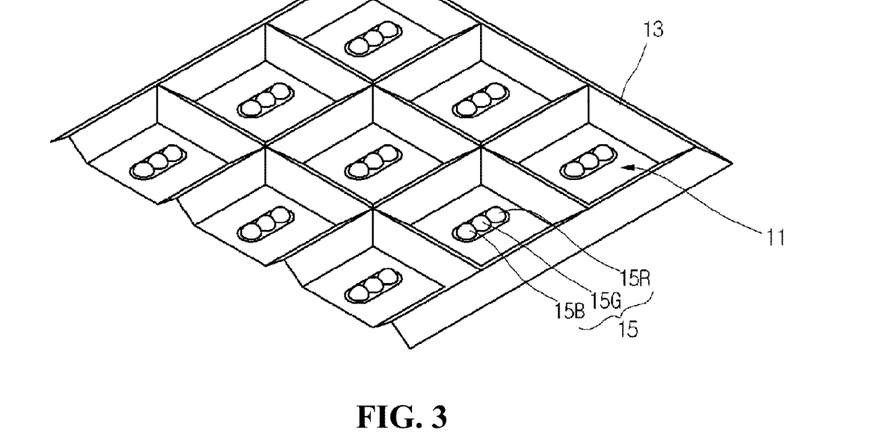
FIG. 3 is a perspective view of the unit LED array in the backlight assembly according to the present invention.

FIG. 1 is a sectional view of a backlight assembly according to an embodiment of the present invention, and FIGS. 2 and 3 are a plan view and a perspective view of a unit LED array in the backlight assembly of FIG. 1, respectively.

Referring to FIGS. 1 to 3, the backlight assembly includes a light-emitting unit having a plurality of unit LEDs arranged in a matrix. Each of the unit LEDs has a red LED 15R, a green LED 15G, and a blue LED 15B.

Also, the backlight assembly includes a plurality of bottom reflectors 11 disposed under the unit LEDs 15 and a plurality of side reflectors 13 disposed around the unit LEDs 15.

As shown in FIGS. 1 to 3, the unit LED 15 may have a single red LED 15R, a single green LED 15G, and a single blue LED 15B.

As shown in FIGS. 4, 5, 7 and 9, the red LED, the green LED, or the blue LED can be provided in plurality.

Although not shown, each of the unit LEDs 15 may also have a plurality of red LEDs, a plurality of green LEDs, and a plurality of blue LEDs.

The backlight assembly may further include a diffusion sheet 17 disposed on the light-emitting unit having the plurality of unit LEDs 15. Thus, the light emitted from the unit LEDs is incident on the diffusion sheet 17.

The light reflected from the diffusion sheet 17 is again reflected from the side reflector 13 and the bottom reflector 11 and is again incident on the diffusion sheet 17.

The side reflector 13 may be formed in one of a rectangular shape, a circular shape or an oval shape. Also, the side reflector 13 and the bottom reflector 11 may be formed in one body.

Figure 14:
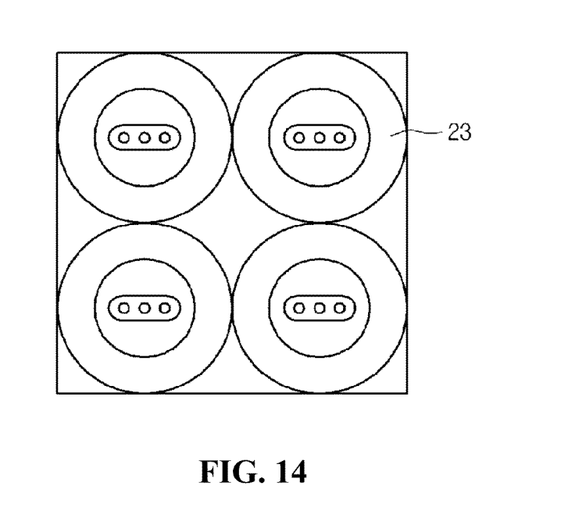
FIGS. 14 and 15 are plan views of the side reflectors in the backlight assembly according to embodiments of the present invention.
Figure 15:
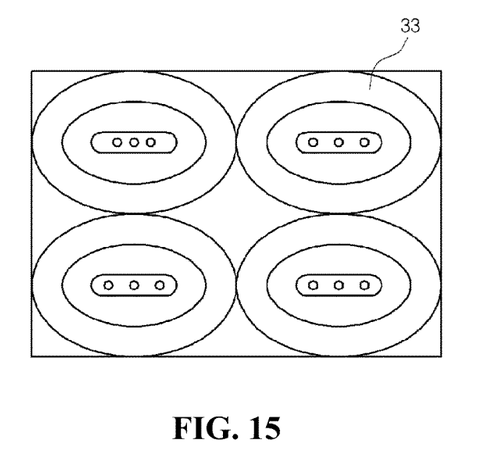

FIG. 2 is a plan view of the side reflector 13 of the rectangular shape. The side reflector 13 may also be pentagonal, hexagonal, and so on. FIG. 14 is a plan view of the circular side reflector 23, and FIG. 15 is a plan view of the oval side reflector 33.

The side reflector 13 or the bottom reflector 11 may be coated for diffusion and reflection.

A reflective surface of at the side reflector 13 and the bottom reflector 11 may be embossed. Also, a reflective surface of at the side reflector 13 or the bottom reflector 11 may be embossed.

Figure 16:
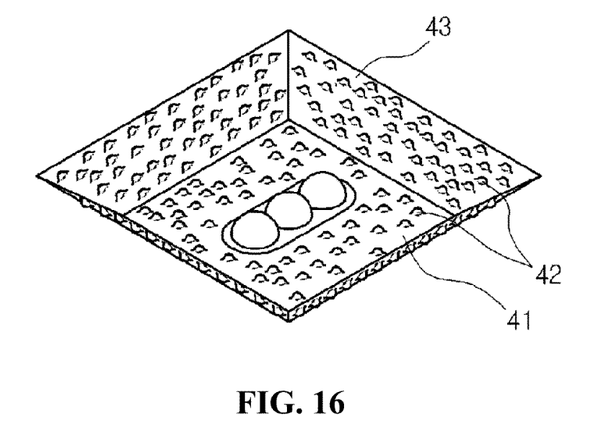
FIG. 16 is a perspective view of an embossed side reflector and an embossed bottom reflector in the backlight assembly according to a further embodiment of the present invention.

FIG. 16 is a perspective view of an embossed side reflector 43 and an embossed bottom reflector 41. Reference character 42 refers to a raised protuberance of the embossed side reflector 43 and embossed bottom reflector 41.

Light emitted upward from the unit LEDs 15 is white light. The white light is formed by the mixture of light emitted from the red LED 15R, the green LED 15G, and the blue LED 15B.

The backlight assembly of the present invention can have excellent characteristics of color mixture and brightness uniformity in the unit LEDs 15R, 15G and 15B. While the related art backlight assembly has only one reflector, the backlight assembly of the present invention has the bottom reflector 11 and the side reflectors 13 in each of the unit LEDs 15.

That is, the unit LED 15 is surrounded by the bottom reflector 11 and the side reflectors 13. The incident light on the reflectors is diffused to have a plurality of orientation angles.

Thus, the mixture property and uniformity of the light emitted from the unit LEDs 15 can be improved and the reflectivity of the individual light reflected from the unit LEDs 15 increased. Also, since light loss does not occur, the unit LEDs 15 can have high internal reflection efficiency.

According to the embodiment of the preset invention, light of individual colors from the LEDs 15R, 15G and 15B have an orientation angle larger than 80 degrees. A primary light having a predetermined orientation angle is diffused to the diffusion sheet 17 and the side reflectors 13.

A secondary light reflected from the diffusion sheet 17 and side reflectors 13 is diffused to the bottom reflector 11 and the side reflectors 13. These diffused light change into tertiary and quaternary diffused light at the bottom reflector 11 and the side reflectors 13 and are then incident on the diffusion sheet 17. Due to the diffused light traveling through these procedures, the light incident on the diffusion sheet 17 can have uniform color mixture and brightness.

FIGS. 4 to 9 are plan views of unit LEDs in the backlight assembly according to various embodiments of the present invention.

Figure 4:
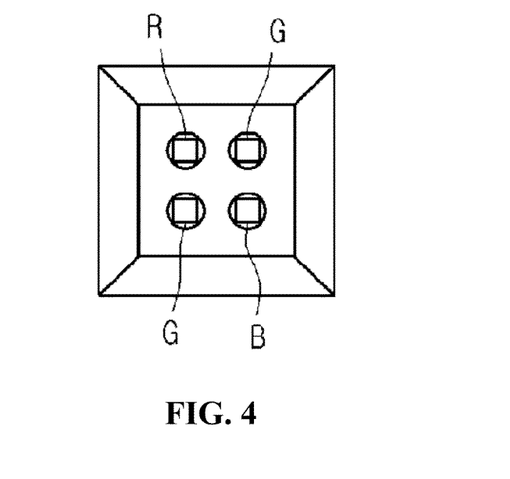
FIGS. 4 to 9 are plan views of unit LEDs in the backlight assembly according to various embodiments of the present invention.

The unit LED shown in FIG. 4 is a "1 in 1 square type" unit LED and has LEDs arranged in a square shape.

Figure 5:
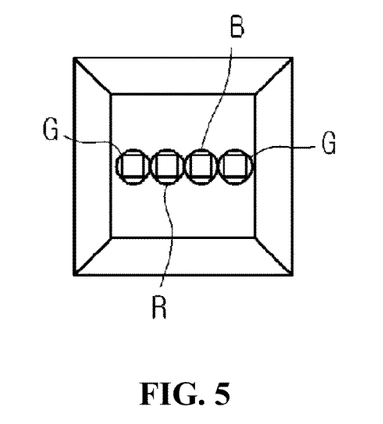

The unit LED shown in FIG. 5 is a "1 in 1 line type" unit LED and has LEDs arranged in a line shape.

Figure 6:
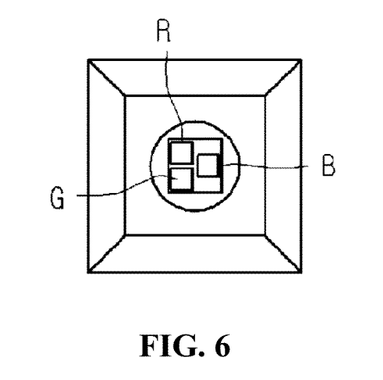

The unit LED shown in FIG. 6 is a "3 in 1 chip on board type" unit LED and has three LEDs molded in one body.

Figure 7:
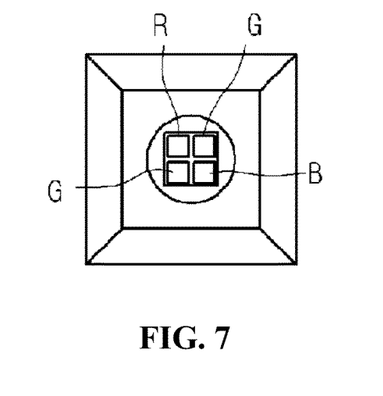

The unit LED shown in FIG. 7 is "4 in 1 chip on board type" unit LED and has four LEDs molded in one body.

Figure 8:
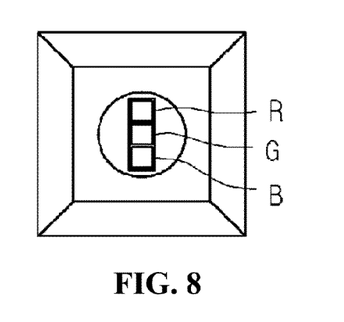

The unit LED shown in FIG. 8 is a "3 in 3 chip on board type" unit LED and has three LEDs separately molded.

Figure 9:
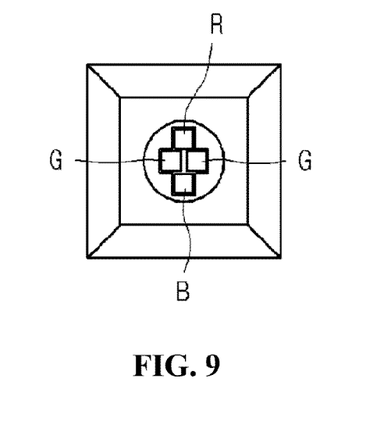

The unit LED shown in FIG. 9 is a "4 in 4 chip on board type" unit LED and has four LEDs separately molded.

As shown in FIG. 4, each of the unit LEDs may have one red LED, two green LEDs, and one blue LED. Alternatively, as shown in FIG. 6, each of the unit LEDs may have one red LED, one green LED, and one blue LED. Also, as shown in FIG. 6, the LEDs may be molded in each unit LED.

Generally, the unit LEDs having the above-described structure emit light upward. In some cases, the unit LEDs may be configured to emit light laterally by adding a lens on the unit LEDs. Since this structure is well known, a detailed description thereof will be omitted.

FIGS. 10 to 13 are sectional views illustrating an end portion of the side reflector 13 in the backlight assembly according to embodiments of the present invention.

In the backlight assembly of the present invention, the diffusion sheet 17 is supported on the side reflectors 13. Thus, the side reflectors 13 can inhibit the diffusion sheet 17 from being bent downward.

That is, the backlight assembly of the present invention has an advantage in that the diffusion sheet 17 provided on the light emitting unit is not bent due to the side reflectors 13. Therefore, a thickness of the diffusion sheet 17 can be reduced.

Figure 10:
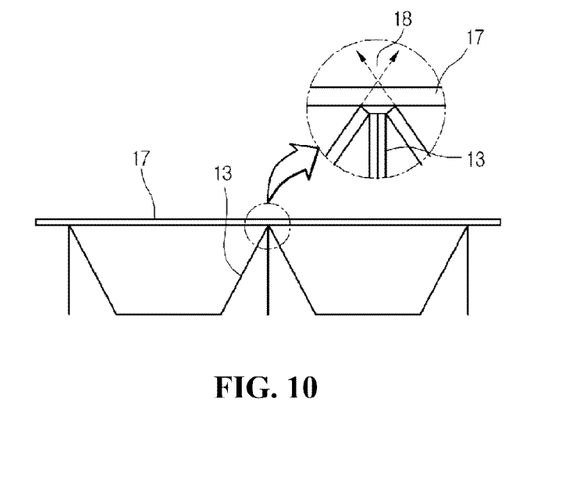
FIG. 10 is a sectional view illustrating an end portion of the side reflector in the backlight assembly according to an embodiment of the present invention.

In the backlight assembly shown in FIG. 10, the end portion of the side reflection 13 is formed in a concave shape or a recessed shape.

Figure 11:
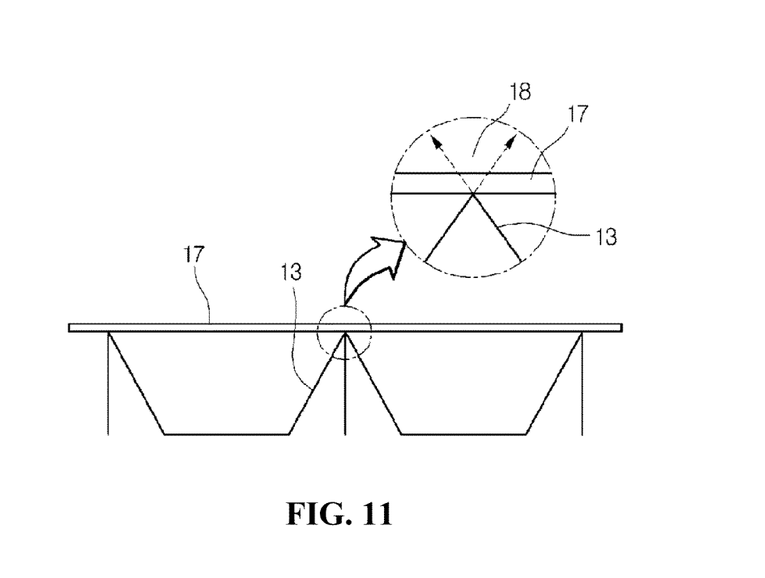
FIG. 11 is a sectional view illustrating an end portion of the side reflector in the backlight assembly according to another embodiment of the present invention.

In the backlight assembly shown in FIG. 11, the end portion of the side reflection 13 is formed in a triangular shape.

Figure 12:
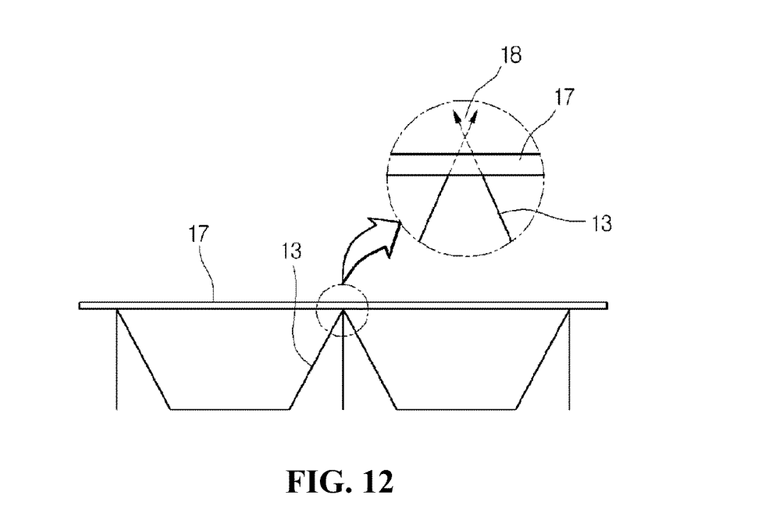
FIG. 12 is a sectional view illustrating an end portion of the side reflector in the backlight assembly according to a further embodiment of the present invention.

In the backlight assembly shown in FIG. 12, the end portion of the side reflection 13 is formed in a planar shape.

Figure 13:
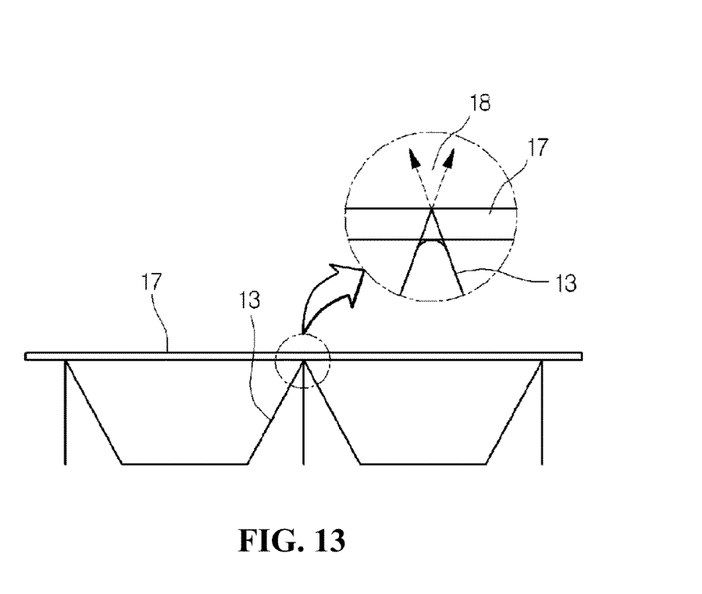
FIG. 13 is a sectional view illustrating an end portion of the side reflector in the backlight assembly according to a further embodiment of the present invention.

In the backlight assembly shown in FIG. 13, the end portion of the side reflection 13 is formed in a semicircular shape or an oval shape.

In the side reflectors 13 of the backlight assemblies shown in FIGS. 10, 11 and 12, a region where the light diffused from the adjacent unit LEDs are overlapped is formed above the diffusion sheet 17.

That is, a region where line extending along the inclined surfaces of the side reflectors 13 in the adjacent unit LEDs are met is formed above the diffusion sheet 17.

In the case of the backlight assembly shown in FIG. 11, a belt of white color is formed by a boundary of the adjacent unit LEDs, that is, the overlapping region 18 above the side reflector 13. On the contrary, in the case of the backlight assemblies shown in FIGS. 10, 12 and 13, a belt of white color is not formed at a boundary of the adjacent unit LEDs, thus exhibiting uniform brightness.

As shown in FIGS. 10, 12 and 13, brightness uniformity of light emitted through the diffusion sheet 17 is improved.

It will be apparent to those skilled in the art that various modifications and variations can be made in the present invention. Thus, it is intended that the present invention covers the modifications and variations of this invention provided they come within the scope of the appended claims and their equivalents.

INDUSTRIAL APPLICABILITY

The backlight assembly and the image display device having the same according to the present invention can improve the degree of color mixture and brightness uniformity when providing light for the image display. Also, the diffusion sheet can be easily installed and designed.

What is claimed is:

1. A lighting unit comprising:
a plurality of LED units, wherein each of the plurality of LED units has a plurality of LEDs;
a reflector comprising a side portion providing a first recess and a bottom portion defining a second recess in which each of plurality of LED units is disposed; and
a diffusion sheet supported by the side portion of the reflector and covering the plurality of LED units,
wherein a top surface of the side portion has a contact portion contacting directly with the diffusion sheet,
wherein the first recess provides a non-contacting portion with the diffusion sheet and is separated from the second recess in which each of the plurality of LED units is disposed,
wherein the first recess is disposed under the diffusion sheet, and
wherein a bottom surface of the first recess is supported by the side portion of the reflector.

2. The lighting unit according to claim 1, wherein at least two LEDs of the plurality of LEDs have wavelength different from each other.

3. The lighting unit according to claim 1, wherein the reflector is formed of circular shape.

4. The lighting unit according to claim 1, wherein the first recess has a polygonal shaped cross section.

5. The lighting unit according to claim 1, wherein the first recess is disposed within the top surface of the side portion.

6. The lighting unit according to claim 1, wherein the plurality of LEDs is arranged in a square shape.

7. The lighting unit according to claim 1, wherein the plurality of LEDs is arranged in a line shape.

8. The lighting unit according to claim 1, wherein the plurality of LEDs includes at least two LEDs selected from the group consisting of a plurality of red LEDs, a plurality of green LEDs, and a plurality of blue LEDs.

9. A lighting unit comprising:
a plurality of LED units;
a diffusion sheet covering the plurality of LED units; and
a side reflector comprising a top surface supporting the diffusion sheet, a bottom surface surrounding each of the plurality of LED units, and a side portion between the top surface and the bottom surface,
wherein the top surface includes a contact portion contacting directly with the diffusion sheet and a first recess providing a non-contacting portion with the diffusion sheet,
wherein the first recess is disposed under the diffusion sheet, and
wherein a bottom surface of the first recess is supported by the side portion of the reflector.

10. The lighting unit according to claim 9, wherein the bottom surface of the side reflector defines a second recess in which each of the plurality of LED units is disposed.

11. The lighting unit according to claim 10, wherein the first recess is separated from the second recess.

12. The lighting unit according to claim 9, wherein each of the plurality of LED units has a plurality of LEDs.

13. The lighting unit according to claim 12, wherein at least two LEDs of the plurality of LEDs have wavelength different from each other.

14. The lighting unit according to claim 12, wherein the plurality of LEDs is arranged in a square shape.

15. The lighting unit according to claim 12, wherein the plurality of LEDs is arranged in a line shape.

16. The lighting unit according to claim 12, wherein the plurality of LEDs includes at least two LEDs selected from the group consisting of a plurality of red LEDs, a plurality of green LEDs, and a plurality of blue LEDs.

17. The lighting unit according to claim 9, wherein the side reflector is formed of circular shape.

18. A lighting unit comprising:
a plurality of LED units, wherein each of the plurality of LED units has a plurality of LEDs;
a diffusion sheet disposed on the plurality of LED units;
a reflector comprising a contact portion contacting directly with the diffusion sheet, a first recess providing a non-contacting portion with the diffusion sheet, a bottom portion defining a second recess in which each of the plurality of LED units is disposed, and a side portion between the contact portion and the bottom portion,
wherein the first recess is disposed under the diffusion sheet, and
wherein a bottom surface of the first recess is supported by the side portion of the reflector.

19. The lighting unit according to claim 18, wherein at least two LEDs of the plurality of LEDs have wavelength different from each other.

20. The lighting unit according to claim 18, wherein the reflector is formed of circular shape.

* * * * *